Patented Sept. 16, 1924.

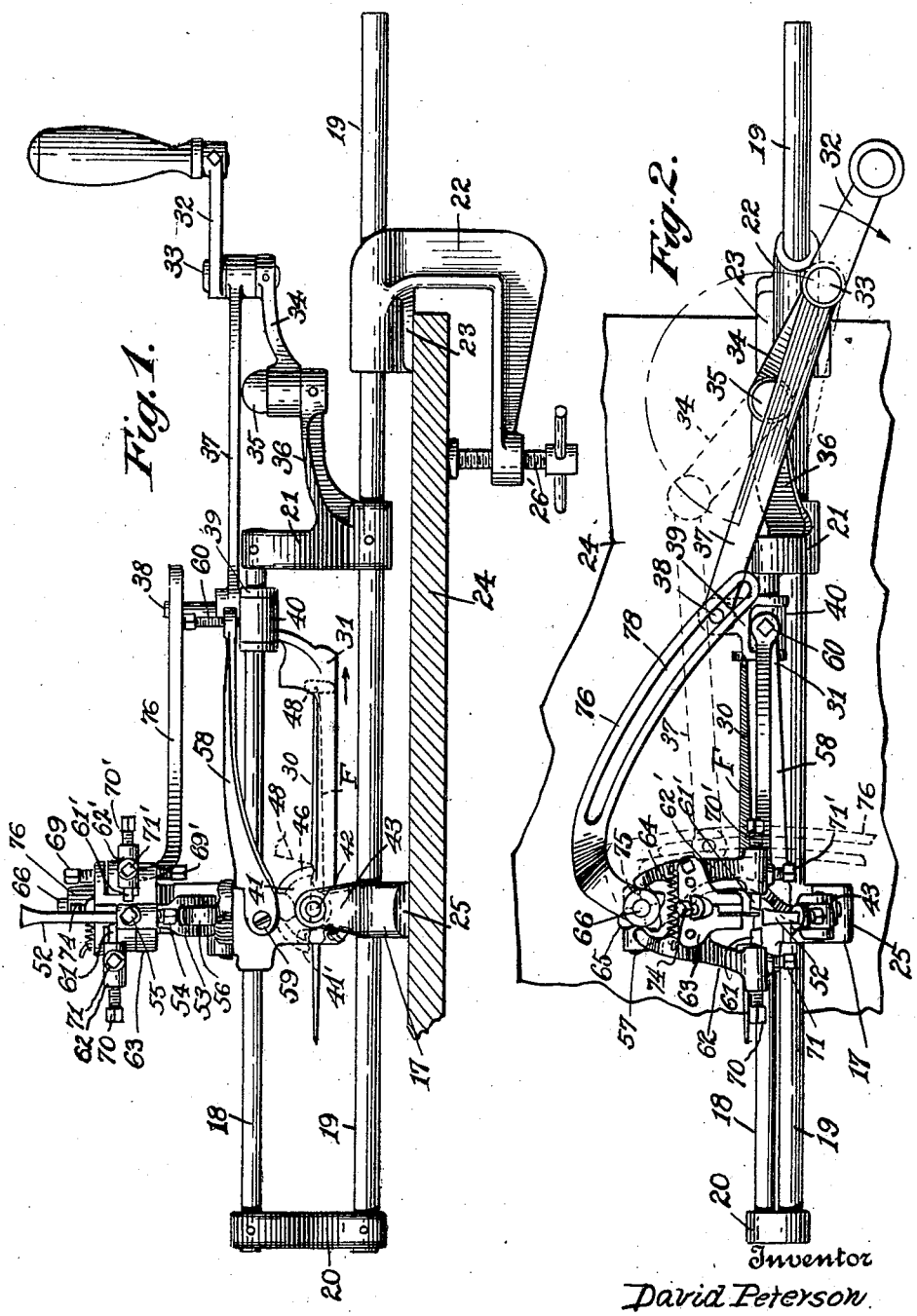

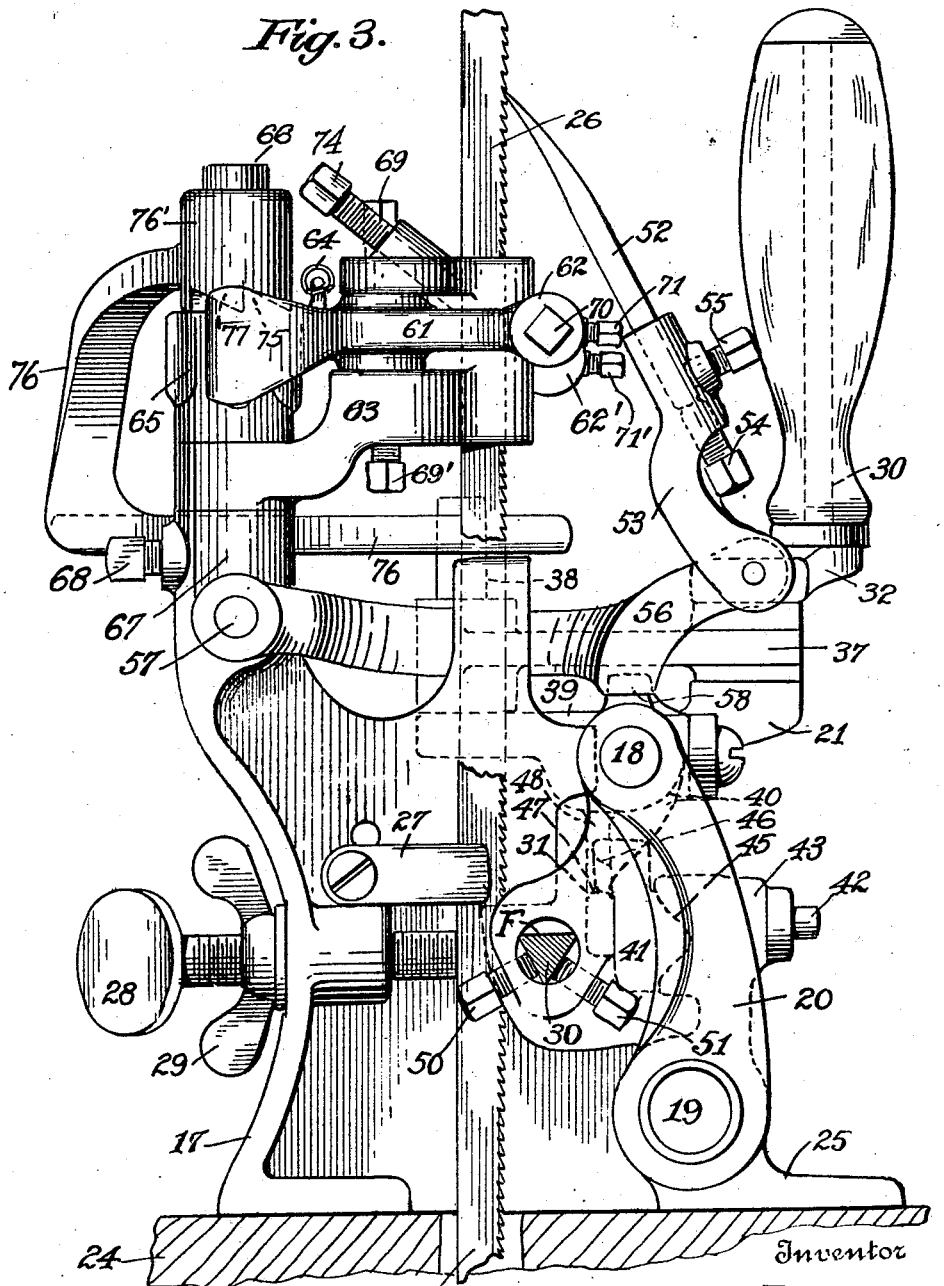

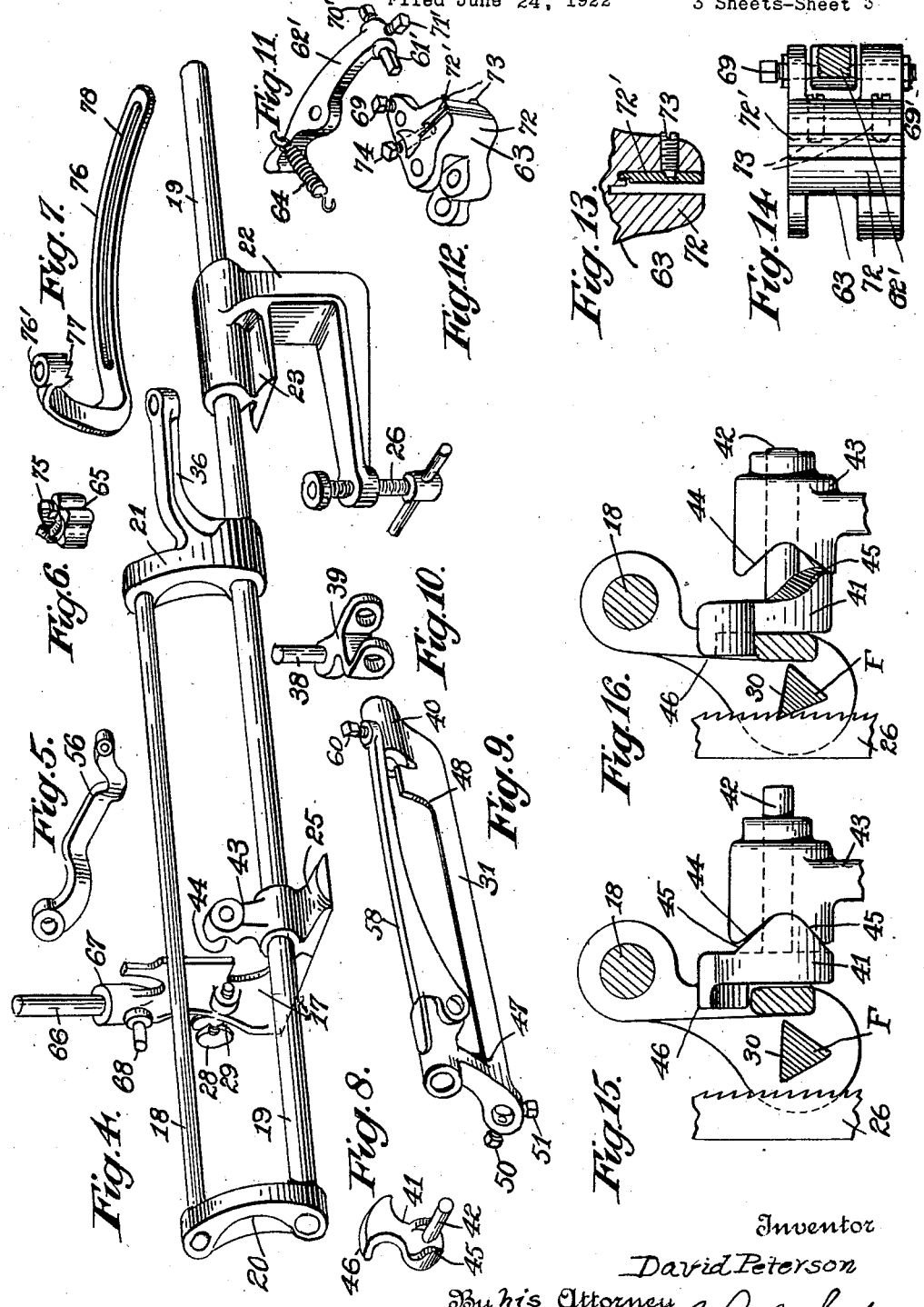

1,508,574

UNITED STATES PATENT OFFICE.

DAVID PETERSON, OF BELLEVILLE, NEW JERSEY, ASSIGNOR OF ONE-HALF TO ROBERT NYDEN, OF BROOKLYN, NEW YORK.

SAW FILING AND SETTING APPARATUS.

Application filed June 24, 1922. Serial No. 570,646.

*To all whom it may concern:*

Be it known that I, DAVID PETERSON, a citizen of the United States, and a resident of Belleville, in the county of Essex and State of New Jersey, have invented certain new and useful Improvements in Saw Filing and Setting Apparatus, of which the following is a specification.

This invention relates to band saw filing apparatus which is adapted to be mounted upon the saw table to file or sharpen the teeth of a band saw without removing the saw from the machine, and it is the object of the invention to provide a saw filing apparatus for this purpose which is novel, simple and cheap in construction and efficient in operation.

To efficiently file the teeth of band saws to sharpen the same with the conventional three-sided saw file, owing to the variations in the angle of the teeth of the saw blade due to irregularities and differences in sizes of such teeth in different sizes of saws, it is necessary to support the file at different angles for different saw teeth to properly position the file relative to the tooth spaces, and it is a further object of the invention to provide improved means for adjustably mounting the file in its carrier and to lock the file in its adjusted position.

It is a further object of the invention to provide improved means in saw filing apparatus to feed the saw blade predetermined distances alternately with the filing of the teeth of the saw blade, and to provide saw blade feeding means which is adjustable to compensate for different sizes of saw teeth and saw blades and to actuate said saw blade feeding means automatically through the operation of the saw filing means.

It is another object of the invention to provide in saw filing apparatus means to set the saw teeth, said saw setting means being operative from the actuating means for the saw filing means and arranged to be inoperative during the saw filing operation, and to provide a saw setting device which is simple and cheap in construction and which is operative to positively set the teeth and adjustable to different sizes of saw teeth.

Other objects and advantages will hereinafter appear.

In the drawings accompanying and forming a part of this specification, Figure 1 is a front elevation showing an embodiment of my improved saw filing and setting apparatus and illustrating the same mounted upon the table of a band saw.

Figure 2 is a plan view of the apparatus shown in Figure 1.

Figure 3 is an enlarged end elevational view looking at the left of Figure 1.

Figure 4 is a perspective view of the frame upon which the operative mechanism is mounted.

Figure 5 is a perspective view of an arm to carry a saw engaging pawl to feed the saw.

Figure 6 is a perspective view of a cam to actuate the saw setting devices.

Figure 7 is a perspective view of the means to operatively connect the cam shown in Figure 6 to and actuate the same from the file carrier actuating means.

Figure 8 is a perspective view of an adjustable guide for the saw blade carrier.

Figure 9 is a perspective view of the file carrier with the cam mounted thereon for actuating the saw blade feeding means.

Figure 10 is a perspective view of the means to connect the saw blade carrier and setting devices actuating means to operating means therefor.

Figure 11 is a perspective view of one of the tooth setting devices.

Figure 12 is a perspective view of a guide block for the saw blade upon which the saw setting devices are mounted.

Figure 13 is a detail sectional view to show the adjustable mounting of one of the jaws of the guide block.

Figure 14 is a side elevation of the guide block to show the adjustable mounting of one of the saw setting devices.

Figure 15 is an enlarged cross sectional view of the file carrier and its support showing the guiding means for the carrier in position to permit the carrier to assume a position with the file out of engagement with the saw blade during one movement of the saw carrier; and Figure 16 is a view similar to Figure 15, but showing the guide for the file carrier adjusted to position the carrier with the file in engagement with the saw blade.

Similar characters of reference designate like parts throughout the different views of the drawings.

In the embodiment of the invention shown in the drawings there is provided a frame comprising a member 17 in which is fixed a pair of rods or tubular members 18, 19, said rods also being fixed in a pair of brackets 20, 21. The rod 19 is extended beyond the bracket 21 and has adjustably mounted thereon a member 22 arranged with a foot portion 23 to engage upon the table 24 of a band saw and in conjunction with a foot portion 25 arranged at the bottom of the frame member 17 which serves to support the apparatus upon the saw table 24. To permit of adjustment of the apparatus relative to the saw blade 26 and secure the same in adjusted position releasable clamping means are provided. For this purpose the bracket 22 is substantially of U-shape having the foot 23 arranged on one leg and the other leg adapted to engage below the saw table and having a clamping screw 26 threaded therein adapted to engage the table in opposed relation to the foot 23.

In mounting the frame upon the saw table the apparatus is adjusted so that one side of the saw blade will lie against a flat side of the frame member 17, as shown in Figure 3, and held against lateral movement by a clip 27 releasably mounted upon the frame member engaging at the opposite side of the saw blade. To properly position the frame upon the saw table in operative relation to the saw blade and the latter to the filing means an adjustable abutment is provided for the rear edge of the saw blade, shown as consisting of a set screw 28 threaded into a boss on the frame member 17 and locked in adjusted position by a lock nut in the form of a wing nut 29.

A tool or file 30 of the conventional three square or saw file is mounted in alined perforations of lugs extending laterally from a carrier 31 for the file (Figures 3 and 9) hung on the rod 18 for swinging movement toward and away from the saw blade and to have reciprocatory movement longitudinally upon said rod, the rod 18 being arranged to extend slightly to the rear of the rod 19 so that the carrier 31 will be suspended from the rod 18 to have movement to the rear of the rod 19. The file carrier is reciprocated by suitable means; in the present instance comprising a crank handle 32 fixed on a pin 33 fixed in an arm 34 rotatably supported on a stud 35 fixed in an arm 36 of the bracket 21. By rotating the crank it will revolve about the stud 35 as an axis. The crank is connected to the file carrier by a link 37 pivotally connected at one end to the pin 33 the opposite end being pivotally mounted on an upstanding stud 38 fixed in a carrier 39 therefor (Figure 10) having a perforated bifurcation whereby it is mounted upon the rod 18 with the portions of the bifurcation at opposite sides of the mounting of the file carrier on the rod, as shown at 40. (Figures 1 and 2.)

To cause the file to engage a tooth space of the saw blade, as shown in Figure 16, during the movement of the file carrier in the direction indicated by the arrow in Figure 1 to file the saw tooth an adjustable guide member is provided for the file carrier, comprising a member 41 fixed to a stud 42 mounted in a perforation in a lug 43 extending upward from the frame member 17 above the rod 19 to have rotative movement and movement in axial direction toward and away from the file carrier. The lug 43 has a cam face 44 at the side opposite to the member 41 and the latter is arranged with a cam face 45 to correspond and co-operate with the cam face 44 of the lug. By rotating the guiding member 41 the cam face thereon will be caused to ride over the cam face 44 and assume the position in relation thereto shown in Figure 15 and thereby moved in an axial direction and away from the saw blade causing the file carrier to assume a position by gravity with the file out of engagement with the saw table. As the guide member 41 is rotated in opposite direction the cam face thereof will be caused to ride upon the cam face 44 of the lug thereby moving the guide member in a direction toward the saw blade and with it move the file carrier to position the file in engagement with a tooth space of the saw blade, as shown in Figure 16. To effect this rotative movement of the guide member 41 it has a circularly arranged or segmental wing 46 (Figure 8) to extend above a rail integrally connected with arms at opposite ends and constituting the file carrier, as clearly shown in Figure 9. With the parts in the position shown in Figure 16 as the crank is operated the file carrier will be moved in a direction indicated by the arrow in Figure 1 and operate to file a saw tooth. As the file carrier approaches the limit of such movement a portion 47 at the one end of the carrier will engage at one side of the wing of the guide member 41 and move it from the dotted line position 41' in Figure 1 to the full line position shown in said figure with the cam portions 44, 45 in the positions shown in Figure 15 and the guide member adjusted in a direction away from the saw blade, when the parts will be in the position shown in Figure 15, and which position they will maintain during the reverse or return movement of the file carrier. As the file carrier approaches the extremity of such reverse movement a cam portion 48 at the opposite end of the file carrier will engage the opposite side of the wing 46 of the guide member 41 rotating the latter in a direction reverse to that hereinbefore described causing the cam portion of the guide member 41 to ride up on the cam 44 of the lug and move the file carrier to position the file in engagement with a tooth space of the saw blade, as shown in Figure 16. These operations are repeated during the alternate reciprocatory movements of the file carrier.

Owing to variations in the teeth of saw blades due to irregularities in cutting, sharpening and other causes, and to differences in sizes of the teeth in different sizes of saw blades, and to facilitate the filing and to compensate for such differences in the teeth of saw blades, means are provided to adjustably mount the file in its carrier 31. For this purpose the file engaging perforations in the carrier lugs are of circular shape to readily permit of the rotative adjustment of the file upon its longitudinal axis in said perforations, and the file is locked in adjusted position by set screws 50, 51, threaded into the carrier and adapted to engage with opposite flat portions of the file, as clearly shown in Figure 3. To present tooth spaces successively for action thereon by the file means are provided to advance or feed the saw blade one tooth space alternately with the saw filing movement of the file carrier, or during the reverse movement thereof. This feeding means comprises a pawl adjustably mounted in an opening in a carrier 53 and adjusted therein by an abutment in the form of a set screw 54 and secured in adjusted position by a set screw 55. The pawl carrier is pivotally mounted at one end of an arm 56 (Figure 5) pivotally supported at 57 upon the frame 17 to extend forwardly over the file carrier, the connection of the pawl carrier 53 with the arm being arranged so that the pawl will engage a tooth space of the saw blade by gravity. The arm 56 is moved upward during the reverse movement of the file carrier and with it the pawl carrier and pawl thereby lifting the saw blade one tooth space, and during the saw filing movement of the file with its carrier the pawl carrying arm 56 is permitted to recede or move by gravity in a reverse direction and with it the feed pawl a distance equal to a tooth space of the saw blade to engage the next successive tooth space. This movement of the feeding pawl is effected by a cam extending longitudinally of and participating in the movement of the file carrier and is arranged on a member 58 pivotally supported at one end, as at 59, on the file carrier, and adjustably supported at the opposite end upon the file carrier by a set screw 60 threaded into the cam member 58 and engaging the file carrier. (Figure 1.) The feeding pawl carrying arm 56 rests by gravity upon this cam member 58 and the latter is constructed and arranged whereby as the file carrier is moved by the guide member 41 to position the file in engagement with a tooth space of the saw blade a low portion of the cam will be presented for engagement by the arm 56, and as the file carrier is moved to effect the saw filing operation said arm 56 will move downward by gravity. As the file carrier at the termination of said movement moves to position the file out of engagement with the saw blade due to the adjustment of the guide member 41 a high portion of the cam 58 will be presented for engagement by the feed pawl actuating arm 56, and during the reverse movement of the file carrier saw feeding movement will be imparted to said arm 56 and the feed pawl. By the arrangement of the set screw 60 the feed pawl will be caused to move a greater or less distance to compensate for varying sizes of saw teeth.

To set the teeth of the saw blade so that successive teeth will be alternately offset in opposite direction relative to the body of the blade the file is removed from its carrier and the cam member 58 is adjusted by the set screw 60 to impart movement to the feeding pawl a distance equivalent to feed the saw blade two tooth spaces, the feeding movement of the pawl being effected through the file carrier actuating crank 32. The teeth are set by a pair of setting punches 61, 61' adjustably carried by arms 62, 62' pivotally supported in a guide block 63 (Figure 12) on axes in a plane with the saw blade and the punches to have movement in a direction transversely of and toward and away from the saw blade. The punch 61 is arranged in line with one tooth while the punch 61' is arranged in a lower plane in line with the successive tooth. The punch carrying arms are normally urged in a direction to move the punches away from the saw blade by a spring 64 and maintain the ends of the arms opposite to the punches in operative engagement with a cam 65 (Figure 6) rotatably mounted on a stud 66 upon which the guide block 63 is mounted, which stud removably engages in a boss 67 on the frame 17 and secured therein by a set screw 68. To adjust the punches for setting teeth of varying sizes the punch carrying arm 62' is supported to have adjustment in an axial direction upon its pivotal support. For this purpose a pair of set screws 69, 69' are threaded into the guide block above and below the arm and the ends adapted to engage the arm and hold the same in adjusted position between the ends of the screws. The punches are adjustably mounted in openings in the arms and to retain the punches in adjusted position abutments in the form of set screws 70, 70' are threaded into the openings of the arms at the end opposite to the punches, the punches being secured in position by set screws 71, 71'.

The block 63 is arranged with opposed jaws 72, 72' for the engagement and guiding of the saw blade, the jaw 72' being mounted to have adjustment toward and away from the jaw 72 to compensate for saw blades of different thicknesses. For this purpose the block has a cut out portion and a correspondingly arranged portion on the jaw 72' to engage in said cut out portion to have swinging movement therein, and the jaw is maintained in fixed space relation to the jaw 72 by set screws 73 threaded into the block and engaging the jaw. To limit the movement of the saw blade between the jaws and to also serve as a stop for the rear edge thereof an abutment in the form of a set screw 74 is threaded diagonally into the block in line with the space between the jaws.

As stated, the punch carrying arms are urged in a direction to move the punches away from the saw blade. To move said arms alternately with the feeding movement of the saw blade to cause the punches to positively engage and set the teeth of the saw blade the cam 65 is intermittently rotated. For this purpose the cam 65 (Figure 6) has arranged concentrically at one end ratchet teeth 75. An arm 76 (Figure 7) has a perforated hub portion 76' whereby it is loosely mounted on the block stud 66, said hub portion being arranged with ratchet teeth 77 to co-operate with the ratchet teeth 75 of the cam 65. By moving the arm in one direction the ratchet teeth 77 thereof will co-operate with the ratchet teeth of the cam to rotate the latter, and when the cam is moved in reverse direction the ratchet teeth 77 on the arm will ride over the cam ratchet teeth the cam being held against movement by the engagement of the punch carrying arms therewith.

To oscillate the arm 76 to effect the rotative cam actuating movement the arm is arranged with a slot 78 for the engagement of the stud 38 of the file carrier actuating means. As the crank 32 is operated and the file carrier moved in one direction and the arm 76 moved to the dotted line position shown in Figure 2 movement will be imparted to the cam 65, and as the file carrier is moved in the opposite direction and the arm to the full line position shown in Figure 2 the arm ratchet 77 will ride idly over the cam ratchet 75. During the saw filing operation the arm 76 is removed, or if desired the entire setting mechanism may be removed from the frame 17 by loosening the set screw 60 and withdrawing the stud 66 from the frame boss 67.

Having thus described my invention, I claim:

1. In a band saw filing apparatus, a frame constructed and arranged to be mounted upon the table of a band saw and having a member for the engagement and guiding of the saw blade at the side thereof; a file carrier; means to pivotally support the carrier and to have longitudinal reciprocatory movement; a fixed circularly arranged cam surface; a complemental cam member pivotally supported concentric of the fixed cam, said supplemental cam member being adapted to be adjusted by the file carrier at the extremity of its movement in one direction relative to the fixed cam to position the carrier with the file to engage a tooth space of the saw blade during the successive movement of the carrier and at the termination of such movement adjusted to permit the carrier to move by gravity away from the saw and maintain such position during the reverse movement of the carrier.

2. In a band saw filing apparatus, a frame constructed and arranged to be mounted upon the table of a band saw in operative relation to the saw blade, and having a part for the engagement and guiding of the saw blade at the side, a pivotally and reciprocably supported file carrier; a fixed cam surface; a complemental cam member adjustable relative to the fixed cam surface and adapted to be adjusted by the file carrier at the extremity of its movement in one direction to position the carrier with the file in saw filing engagement with a tooth space of the saw during the successive movement of the carrier and at the termination of such movement adjustable by the carrier to permit the carrier to move by gravity away from the saw and maintain such position during the reverse movement of the carrier.

3. In a band saw filing apparatus, a file carrier; a fixed support from which the carrier is pivotally hung and relative to which the carrier is adapted to have longitudinal reciprocable movement; means to reciprocate the carrier; a fixed cam surface on the support in line with the movement of the carrier; an adjustable cam member to co-operate with the fixed cam surface, said adjustable cam member in one position thereof co-operating with the carrier to move and retain the carrier in filing position during the movement of the carrier in one direction, and in another position during the reverse movement of the carrier permitting the latter to move out of filing position for the purpose specified.

4. In band saw filing apparatus, a frame arranged to be mounted upon the saw table; means to guide the saw blade in the frame; a file carrier reciprocable transversely of the saw blade, means to position the carrier with the file engaging a tooth space of the saw blade during the filing movement of the file and permit the carrier to assume a position with the file out of operative relation with the saw blade during the reverse movement; a pivotally supported pawl to engage a tooth of the saw blade to advance the latter; and a cam surface on the file carrier to co-operate with the pawl support to actuate the pawl to feed the saw blade during the movement of the file carrier with the file out of engagement with the saw blade.

5. In band saw filing apparatus, a frame to be mounted upon the saw table and arranged with means to guide the saw blade; a file carrier supported to have reciprocable movement transversely of and to have movement toward and away from the saw blade; means to reciprocate the carrier; an adjustable guide for the carrier operable by the carrier as it approaches the termination of one of its movements to move the carrier to position with the file in engagement with the saw blade, and operable by the carrier at the termination of said movement to permit the carrier to assume a position with the file out of engagement with the saw blade during the successive return movement of the carrier; and means operable from the file carrier during the latter movement thereof to feed the saw blade.

6. In band saw filing apparatus, a frame to be mounted upon the saw table and arranged with means to guide the saw blade; a file carrier supported to have reciprocable movement transversely of the saw blade and maintained in engagement with the saw blade during one of said movements and permitted to move out of engagement with the saw blade during the reverse movement thereof; a pivotally supported pawl to engage the teeth of the saw blade; and a cam carried by the file carrier to cooperate with the pivotal support of the pawl during the movement of the file carrier with the file out of engagement with the saw blade to impart movement to the pawl support to actuate the pawl to feed the saw blade.

7. In band saw filing apparatus, a frame to be mounted upon the saw table and arranged with saw guiding means; a file carrier supported to have reciprocable movement transversely of and movement toward and away from the saw blade; means to reciprocate the carrier; means operable to move the carrier with the file to engage a tooth space of the saw blade as the carrier moves in one direction and permit the carrier to move to position with the file out of engagement with the saw blade during the reverse movement of the carrier; a cam adjustably mounted on the carrier to extend longitudinally thereof; a pivotally supported arm to engage the cam by gravity; an adjustably mounted pawl to engage the teeth of the saw blade pivotally carried by said arm; said cam being operable to impart movement to the pawl to feed the saw blade during the movement of the carrier with the file out of engagement with the saw blade and permit of receding movement of said pawl during the movement of the carrier with the file in engagement with the saw blade.

8. In band saw filing apparatus, a frame to be mounted upon the saw table and arranged with saw blade guiding means; a file carrier supported to have reciprocable movement transversely of and toward and away from the saw blade; saw blade feeding means operative from said carrier; and means to reciprocate the carrier comprising a rotatably supported arm, a crank connected to said arm, and a link connection from the connection of the crank with said arm and the file carrier.

9. In band saw filing apparatus, a frame arranged with feet to support the frame upon the saw table, one of which feet is adjustable relative to the frame and arranged with means to clamp the frame to the saw table; saw blade guiding means arranged on the frame; a file carrier supported upon the frame to have reciprocatory movement transversely of and toward and away from the saw blade; saw feeding means operable from the file carrier; and means to reciprocate the file carrier.

10. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade.

11. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a guide block for engagement of the saw blade, setting punches pivotally supported on axes in a plane with and at opposite sides of the saw blade to have movement toward and away from the saw blade and normally urged in a direction away from the saw blade, and means operable from the file carrier to positively move the punches toward the saw blade for the purpose specified.

12. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a guide block for the engagement of the saw blade, arms pivotally supported by the block at opposite sides of and to have movement on axes in a plane with the saw blade and normally urged in a direction outward from the saw blade, setting punches carried by said arm to engage at opposite sides of the teeth of the saw blade, a rotatable cam to co-operate with said arms to positively move the punches into engagement with the teeth of the saw blade, and means operable from the file carrier to intermittently rotate the cam.

13. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a guide block having a fixed jaw and an adjustable jaw between which the saw blade engages, arms pivotally supported by the block to have movement on axes in a plane with and at opposite sides of the saw blade, setting punches carried by said arms to engage at opposite sides of the teeth of the saw blade, a spring to normally urge said arms in a direction with the punches out of engagement with the teeth of the saw blade, a rotatable cam to co-operate with said arms to positively move the punches into engagement with the teeth of the saw blade, and means operable from the file carrier to intermittently rotate the cam.

14. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a block having a pair of jaws between which the saw blade engages, arms pivotally supported on axes in a plane with the saw blade, setting punches carried by said arms to engage at opposite sides of the teeth of the saw blade, said arms being normally urged in a direction with the punches out of engagement with the teeth of the saw blade, a rotatable cam to co-operate with said arms to positively move the punches into engagement with the teeth of the saw blade, said cam being arranged with ratchet teeth concentrically at one end, an arm pivotally supported axially of the cam to have movement axially toward and away from the cam, said arm having ratchet teeth to co-operate with the ratchet teeth of the cam, and means to oscillate said arm from the movement of the file carrier to intermittently rotate the cam.

15. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a guide block for the engagement of the saw blade, setting punches pivotally supported on axes in a plane with the saw blade and arranged at opposite sides of the teeth of the saw blade, said punches being normally urged in a direction away from the blade, a rotatable cam to co-operate with said punches to positively move the same into engagement with the teeth of the saw blade and having concentrically arranged ratchet teeth at one end, a slotted arm pivotally supported at one end axially of the cam and to have axial movement toward and away from the cam, said arm being arranged with ratchet teeth to co-operate with the ratchet teeth of the cam, and a stud mounted on the file carrier to engage the slot of the arm and operative during the reciprocation of the file carrier to oscillate said arm to intermittently rotate the cam.

16. In band saw filing apparatus, the combination with a reciprocable file carrier, of saw feeding means; a cam mounted on the file carrier to actuate the saw feeding means; means to reciprocate the file carrier; and means operative from the file carrier reciprocating means alternate with the actuation of the feeding means to set the teeth of the saw blade, comprising a guide block for the engagement of the saw blade, setting punches pivotally supported by the block to engage at opposite sides of the saw blade to have movement in a plane transversely of the saw blade and normally urged in a direction away from the saw blade, and one of which punches is adjustable axially on its pivotal support in a direction toward and away from the other punch, and means operative through the movement of the file carrier to positively move the punches in a direction to engage with the teeth of the saw blade.

DAVID PETERSON.